May 22, 1945.  B. G. BENAWAY  2,376,322

SELECTOR VALVE

Filed Aug. 3, 1942

Inventor:
BERNARD G. BENAWAY,
By
Attorney.

Patented May 22, 1945

2,376,322

UNITED STATES PATENT OFFICE 2,376,322

SELECTOR VALVE

Bernard G. Benaway, Los Angeles, Calif., assignor to Aireon Manufacturing Corporation, a corporation of California Application August 3, 1942, Serial No. 453,359

7 Claims. (Cl. 277—20)

This invention relates to a selector valve of the type used for controlling delivery of fluid to hydraulic motors and is especially adapted for aircraft installation for controlling the operation of a reversibly movable piston or hydraulic motor employed to move landing gears and other movable parts of an aircraft.

The invention is an improvement in poppet type selector valves having an inlet which is connected to a source of fluid under pressure, and having therein poppet valves for controlling the flow of fluid through various ports and passages. These poppet valves are arranged to open against the pressure of the fluid which is controlled and therefore the force required to open such poppet valves is relatively great and varies with the pressure controlled. An objectionable feature of such poppet selector valves is the manual effort required to operate them.

It is an object of this invention to provide a selector valve unit of the character described which requires but small manually applied force to operate the same, and which is very simple, small, compact, and inexpensive of fabrication.

It is another object of the invention to provide a selector valve of the character described of such simplicity that the housing of the unit can be readily machined by simple milling and boring and drilling operations from a one-piece block or casting.

It is still another object of the invention to provide a selector valve unit of the character described in which the closure bodies are of resilient yieldable material such as one of the so-called plastics, and in which the cooperating parts are so formed that plastic closures may be satisfactorily employed.

It is another object of the invention to provide a selector valve unit of the character described in which the valve closing elements are held to their seats by a fluid pressure differential supplied from the downstream side of the valve seat, this pressure differential positively holding the valve closures seated when in closed position, but presenting a predetermined and ordinarily relatively small resistance to opening movement of the valve closures.

It is another object of the invention to provide a selector valve in which the closures are moved toward opened positions by actuating rods and cooperate with these rods in such a manner as to be guided and aligned thereby, and in which the rods for operating the valve closures are moved by an oscillatable shaft through use of a novel cam connection between the shaft and rods which ensures a positive quick opening of the valve closures, holds them securely in open position, and requires low operating power.

Further objects and advantages of the invention will be brought out in the following part of the specification.

Referring to the drawing which is for illustrative purposes only,

Figure 1:
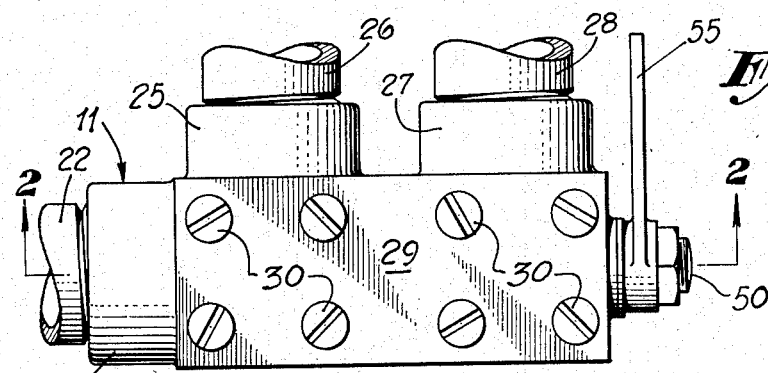
Fig. 1 is a top plan view of a selector valve unit embodying this invention.
Figure 2:
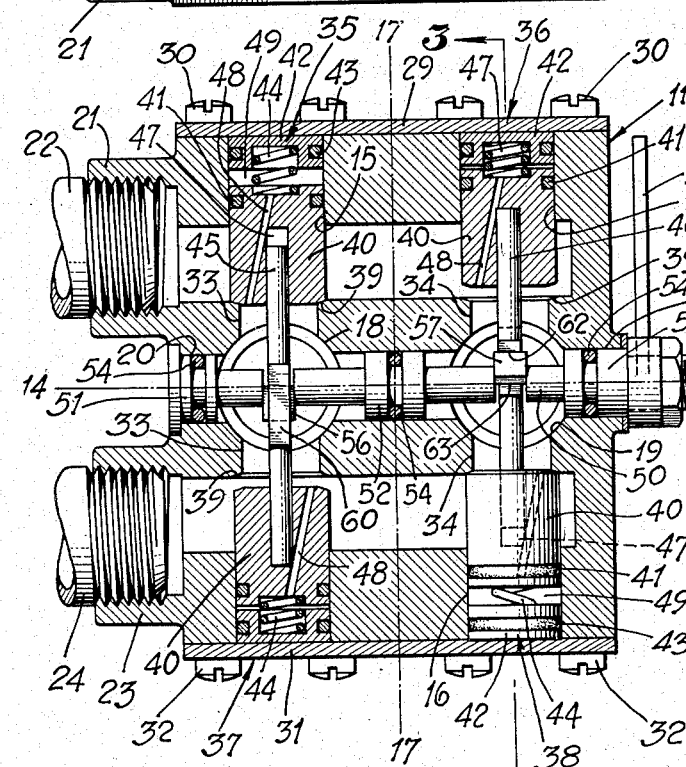
Fig. 2 is a sectional view taken as indicated by the line 2—2 of Fig. 1.

The operative parts of the selector valve are contained in a compact metal housing 11 having a fluid inlet passage 12 of rectangular cross section and a fluid outlet passage 13 of rectangular cross section. These passages or chambers are symmetrically located on opposite sides of a central plane 14 parallel to the top and bottom faces of the housing 11. The housing 11 is bored to provide the valve passages, chambers, or bores 15 and 16 symmetrically located on opposite sides of a central plane 17 between the ends of the housing, these bores intersecting the chambers 12 and 13 and extending through the block 11 from top to bottom thereof.

For connection to the reversible hydraulic motor, or opposite ends of a cylinder to be served by the valve, the housing 11 is also formed with a service bore 18 and a service bore 19 extending inwardly from one end of the housing 11 to an end wall adjacent the other end of the housing, each bore interesting one of the valve bores perpendicularly. The housing 11 is also formed with a valve control bore 20 extending through the housing from end to end thereof and disposed with its axis in the central plane 14 and passing through the intersections of the service bores 18 and 19 with the valve bores 15 and 16.

One end of the housing 11 is formed with a boss 21 providing an enlarged cylindrical internally threaded extension of the chamber 12 for connection to an inlet pipe 22 and constituting the inlet port of the valve unit. A similar boss 23 provides an outlet port for the valve unit and is adapted for connection to an outlet pipe 24. The chambers 12 and 13 terminate at right end walls adjacent the right end of the housing 11. One side of the housing is formed with the bosses 25 and 27 forming service ports communicating with the service bores 18 and 19 and adapted for connection to the service pipes 26 and 28 respectively.

A cover plate 29 is secured by screws 30 to the top of the housing 11 for closing the upper ends of the valve bores 15 and 16 and a similar cover plate 31 is secured by screws 32 to the bottom of the housing 11 for closing the lower ends of the valve bores 15 and 16.

The central portion of each valve bore 15 and 16 between the inlet chamber 12 and outlet chamber 13 is of smaller diameter than the end portions of these two bores, the central bore portions being designated by the numerals 33 and 34. Each of the four intersections between the valve bore portions or ports 33 and 34 with the inlet chamber 12 and outlet chamber 13 are formed to provide four circular valve seats 39 for four valve devices 35, 36, 37, and 38 respectively. Since these four valve devices are of identical character, the following description of one valve device will suffice for all.

A valve closure 40 for the valve seat 39 consists of a cylindric block of a diameter to slidably engage the walls of the associated end portions of the valve bore and carries a sealing ring 41 to prevent passage of fluid between the inlet chamber 12 and a valve chamber 49 behind the valve closure 40. A feature of the invention is that the closure 40 is of plastic or material of similar characteristics. A retainer disc 42 carrying a sealing ring 43 and disposed against cover plate 29 provides a fixed seat for a spring 44, the other end of which bears against the valve closure 40 tending to resiliently move it into engagement with the valve seat 39. It will be observed that the valve seat 39 is an annulus having an outside diameter equal to the diameter of the end portion of the valve bore 15 and an inside diameter equal to that of the valve port 33 or 34.

The valve closures 40 of the valve devices 35 and 37 are actuated by a tappet rod 45 and a similar tappet rod 46 actuates the valve closures 40 of the valve devices 36 and 38. Each valve closure 40 is bored to provide a guide socket 47 extending into the closure from the circular face thereof encircled by the valve seat, this socket slidably receiving one end of the associated tappet rod, but providing such close fit that the rod 45 will have the function of a guide extending between two opposite closures 40.

A pressure equalizing force or passage 48 connects the inner end face of the valve closure 40 with the valve chamber 49 and has a communicating connection intermediate its ends with the upper end of the socket chamber 47. When the valve closure 40 is in engagement with the valve seat 39 it is held in that position both by the spring 44 and by the inwardly acting force of the excess of fluid pressure acting on its outer end face over the fluid pressure acting on its inner end face. The passage 48 provides that the fluid pressure per unit area acting upon the two ends of the valve closure be the same, but since the area of the upper end face of the valve closure 40 is greater than the area of the inner face thereof, there exists an inwardly acting net fluid pressure which supplements the spring 44 in holding the valve closure to its seat. This inwardly acting fluid pressure force is not affected by the pressure in the chamber 12, whether that pressure be greater or less than that in the bore chamber 15 insuring the valve closure against accidental opening. Since the difference in pressures acting upon the two ends of the valve closure is relatively small and the spring 44 is relatively weak, unseating of the valve closure by the tappet rod 45 by a relatively small thrust force may be effected.

The tappet rods 45 and 46 are actuated by a valve operating shaft 50 which is rotatively mounted in the valve control bore 20 by means of the annular flanges 51, 52, and 53 formed on the shaft 50, each flange being provided with a sealing ring 54 to prevent escape of fluid from either valve bore 33 or 34 to the other valve bore or to the exterior of the housing 11. The shaft 50 has a cut away section at each intersection of its axis with the axis of one of the tappet rods 45 and 46. At each of these intersections the shaft is cut away to leave a cam arm, sector shaped in transverse section, the axis of each sector coinciding with the axis of the shaft, the cam arm opposite the tappet rod 45 being designated by the numeral 56 and that opposite the tappet rod 46 being designated by the numeral 57. The radially extending faces of these sector shaped cam arms constitute an upper cam face 58 and a lower cam face 59. The cam arms 56 and 57 extend radially outwardly from the shaft axis in diametrically opposite directions.

Each tappet rod 45 or 46 is forged and machined to present an offset rectangular column 60 laterally outwardly displaced from the tappet rod axis where that axis intersects the shaft and to present a pair of cam follower arms 61 extending laterally from the tappet rod in an opposite direction from the column 60 and at the upper and lower ends of that column to form upper and lower cam follower faces 62 and 63, respectively. These cam follower faces 62 and 63 extend radially from the tappet rod axis at the upper and lower ends respectively of an inner face 64 of the column 60 which lies in an axial plane of the tappet rod.

The radial length of the cam arms 56 and 57 is slightly less or substantially the same as the length of the inner face 64 of the tappet rod column 60. The offset columns 60 of the tappet rods 45 and 46 extend in opposite directions, the cam arm 56 being disposed between the cam follower arms 61 of tappet rods 45 and the cam arm 57 being disposed between the cam follower arms 61 of the tappet rod 46.

It is apparent that when the shaft 50 is in that angular position at which the cam arms 56 and 57 extend substantially horizontally in opposite direction, the tappet rods 45 and 46 will each be in an intermediate position with their upper ends at the same level and their lower ends at the same level. Since the tappet rods are shorter than the distance between the inner ends of the socket chambers 47 when both the valve closures 40 at the ends of a tappet rod are seated, and since the tappet rod in each case is so disposed with reference to its cam arms 56 or 57 and with reference to the valve closures 40 that its ends are symmetrically related to the valve closures 40 when the latter are both seated, there exists a small clearance at this juncture between either end of the tappet rod and the inner end of the corresponding socket chamber 47 permitting both valve closures 40 to be simultaneously seated upon their valve seats 39. When the cam arms 56 and 57 are both horizontal, all four valve closures are in seated position. A handle 55 is secured to one of the ends of the shaft 50 where that shaft projects beyond the housing 11. When all four valve closures are seated, the handle 55 is in the upright position indicated in phantom lines in Fig. 3.

Figure 3:
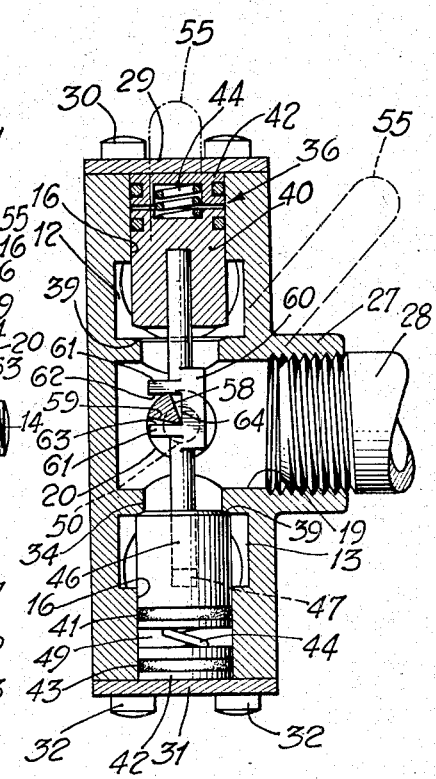
Fig. 3 is a sectional view taken as indicated by the line 3—3 of Fig. 2.

If now the handle 55 be moved to a right hand position as shown in phantom in Fig. 3, the leftward cam arm 56 moves downwardly, actuating the tappet rod 45 in the same direction to open the lower leftward valve closure 40 and the rightward cam arm 57 moves upwardly, correspondingly actuating the tappet rod 46 to unseat the upper valve closure 40 at the rightward end of the valve unit. Fluid may then flow in from the high pressure conduit 22 to the chamber 12 to valve bore 34 and service bore 19 into the service conduit 28, applying fluid pressure to one side of a hydraulic motor (not shown). At the same time fluid may flow from the other side of the hydraulic motor from the service conduit 26 into the service bore 18 and thence through the valve bore 33 and the outlet chamber 13 to the low pressure fluid conduit 24. When the handle 55 is moved back to its upright position and on to a leftward position (not shown), the leftward upper valve closure 40 and rightward lower valve closure 40 are open and the other two valve closures seated to reverse the flow of fluid through the unit and operate the hydraulic motor in the opposite direction.

It will be observed that upon movement of either cam arm 56 or 57 either upwardly or downwardly, its engagement with the corresponding cam follower face 62 or 63, due to its arcuate path, is of a character to cause an initially rapid opening movement of the associated valve closure 40 which becomes progressively slower until the cam face 58 or 59, as the case may be, engages the inner face 64 of the offset column 60 of the tappet rod. When this latter engagement is effected, the cam arm holds the tappet rod securely in position against any force tending to reversibly move the tappet rod, because of the tangential position of the cam follower face with respect to the peripheral face of the cam arm. At this and all other relative positions, however, of the cam arm and tappet rod, the shaft 50 may be easily rotated with little effort on the part of the operator.

I claim as my invention:

1. In a selector valve unit, the combination of: a housing having a pair of parallel open ended first elongated chambers lying in a first direction; a pair of closed ended parallel second elongated chambers lying in a second direction perpendicular to said first direction, each of said second chambers intersecting each of said first chambers providing four first intersections; a pair of open ended parallel third elongated chambers lying in a third direction perpendicular to each of said first two directions, each of said third chambers intersecting an associated one of said second chambers at a locus between said first chambers providing two second intersections; a valve means at each of said first intersections for controlling flow of fluid between the associated first chamber and the central portion of the associated second chamber; a fourth elongated chamber lying in the plane of and intermediate said first chambers and passing through both of said second intersections; a valve operating shaft in said fourth chamber having a fluid tight engagement with the walls of said fourth chamber between said second intersections; means preventing the escape of fluid from the ends of said fourth chamber; and valve operative connections in said second chambers between said shaft and said valve means respectively.

2. In a selector valve unit, the combination of: a one-piece solid housing having a pair of parallel elongated chambers extending from the exterior of said block in a first direction to a transverse plane adjacent the opposite face of said block, a pair of parellel through first bores axially co-planar with said chambers, each of said bores intersecting perpendicularly each of said chambers to provide four first intersections, said chambers having means at their outer ends for connection to a high pressure fluid supply conduit and a low pressure fluid return conduit respectively and being of rectangular cross section along the remainder of their length including said first intersections to provide at said intersections outwardly facing circular valve seats, each of said first bores being of reduced diameter between the two first intersections thereon, a pair of parallel second bores extending from a face of said housing to perpendicularly intersect said first bores respectively to provide two second intersections each disposed between two of said first intersections, each of said second bores being for connection to a service conduit respectively, and a third bore passing through said second intersection; four cylindrical valve closures slidable in the outer large diametered ends respectively of said first bores and engaging the said four valve seats respectively; a valve operating shaft in said third bore having fluid tight engagement with the walls of said third bore between said second intersections and at one end of said third bore and projecting from said housing at said one end; means closing the other end of said third bore; means connected to said projecting shaft end for operating said shaft; means in said first bores including connections between said shaft and said four valve closures for the operation of said valve closures; and a cover plate means for each opening at each end of said first bores.

3. In a selector valve unit, the combination of: a valve body having an inlet port, an outlet port, a service port, and a passage having an outwardly facing valve seat at each end, said passage being communicatingly connected at its two ends to said inlet and outlet ports respectively and at an intermediate point to said service port; a poppet valve closure engaging each of said seats, each of said closures having a socket at its inner end; a tappet rod longitudinally disposed in said passage with its ends engaging said sockets and upon reciprocation alternately engageable at its ends with said valve closures respectively, said rod having an axially offset longitudinally median portion providing oppositely facing transverse axially displaced cam follower faces on said rod; and a valve operating shaft mounted in said housing with its axis perpendicularly intersecting the axis of said rod at said offset portion, said shaft being shaped to have an axially eccentric portion at said intersection, said portion being a cam disposed between said cam follower faces for engagement therewith to reciprocally move said rod upon oscillation of said shaft, said rod being of such a length and disposition that its ends are slightly spaced from said socket inner ends when both said valve closures are seated.

4. The combination defined in claim 3 in which said offset rod portion and cam follower faces form a channel arranged transverse the rod axis and said shaft eccentric portion is a cylindric acute angled sector coaxial with said shaft and having a radius approximately equal to the spacing of said cam follower faces.

5. In a selector valve unit, the combination of: a valve body having an inlet port, an outlet port, two service ports, two passages each having an outwardly facing valve seat at each end, and being communicatingly connected at its two ends to said inlet and outlet ports respectively and at an intermediate point to one of said service ports respectively; a poppet valve closure engaging each of said four seats; a tappet rod longitudinally disposed in each of said passages and upon reciprocation alternately engageable at its ends with the associated two of said valve closures respectively, said rod having an axially offset longitudinally median portion providing oppositely facing transverse axially displaced cam follower faces on said rod; and a valve operating shaft mounted in said housing with its axis perpendicularly intersecting the axes of said rods at their offset portions, said shaft being shaped to have two axially eccentric portions at said intersections respectively, each of said portions having a cam disposed between said cam follower faces for engagement therewith to reciprocally move the associated rod upon oscillation of said shaft, each of said rods being of such a length and disposition that its ends are slightly spaced from said associated socket inner ends when both said associated valve closures are seated, the offset portions of said two rods extending laterally in opposite directions and the two eccentric portions of said shaft extending radially in opposite directions.

6. In a valve of the character described, the combination of: walls forming an intermediate fluid chamber, a pair of outer chambers formed on the opposite sides of said intermediate chamber, and oppositely disposed ports connecting said outer chambers with said intermediate chamber; a member extending across said intermediate chamber, with the opposite ends thereof in cooperative relation to said ports; closures slidably interengaging the opposite ends of said member, said closures being respectively adapted to close one of said ports, said member and said closures being so formed that the sliding interengagement therebetween will guide said closures in their movement relative to said ports; and operating means to shift said member in one direction and relative to one of said closures whereby the other of said closures will be moved into open relation to the port with which it cooperates, and to shift said member in the opposite direction whereby it will move the other of said closures into open relation to the port with which it cooperates.

7. In a valve of the character described, the combination of: walls forming an intermediate fluid chamber, a pair of outer chambers formed on the opposite sides of said intermediate chamber, and oppositely disposed ports connecting said outer chambers with said intermediate chamber; a member extending across said intermediate chamber, with the opposite ends thereof in cooperative relation to said ports; closures engaged by the opposite ends of said member, said closures being respectively adapted to close one of said ports, and said member having sliding engagement with one of said closures whereby it will guide the inner ends of said closures in their movement relative to said ports; guides to guide the outer ends of said closures; and operating means to shift said member in one direction whereby one of said closures will be moved into open relation to the port with which it cooperates, and to shift said member in the opposite direction whereby it will move the other of said closures into open relation to the port with which it cooperates.

BERNARD G. BENAWAY.